United States Patent
Thompson et al.

(10) Patent No.: US 9,821,629 B2
(45) Date of Patent: Nov. 21, 2017

(54) OPERATOR STATION

(71) Applicant: Deere & Company, Moline, IL (US)

(72) Inventors: Michael Thompson, Bettendorf, IA (US); Benjamin J. Jordan, Davenport, IA (US); Richard K Rogers, Davenport, IA (US); Trent Kulig, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/747,008

(22) Filed: Jun. 23, 2015

(65) Prior Publication Data

US 2016/0375741 A1 Dec. 29, 2016

(51) Int. Cl.
 *B60H 1/00* (2006.01)
 *B60H 1/24* (2006.01)
 *B62D 33/06* (2006.01)

(52) U.S. Cl.
 CPC ......... *B60H 1/00378* (2013.01); *B60H 1/245* (2013.01); *B60H 1/246* (2013.01); *B62D 33/0617* (2013.01); *B60H 1/00564* (2013.01); *B60H 2001/00221* (2013.01); *B60H 2001/00228* (2013.01)

(58) Field of Classification Search
 CPC ............ B60H 1/00357; B60H 1/00378; B60H 1/00507; B60H 1/0055; B60H 1/00557; B60H 1/00564; B60H 1/245; B60H 1/262; B62D 33/0617
 USPC ................. 296/190.01, 190.09, 212
 See application file for complete search history.

(56) References Cited

U.S. PATENT DOCUMENTS

| | | | | |
|---|---|---|---|---|
| 4,344,356 A | * | 8/1982 | Casterton | B60H 1/00378 165/42 |
| 4,531,453 A | * | 7/1985 | Warman | B60H 1/00378 454/139 |
| 5,119,718 A | * | 6/1992 | Wagner | B60H 1/00378 296/208 |
| 6,398,294 B1 | * | 6/2002 | Bollweg | B60H 1/00378 296/190.09 |

(Continued)

FOREIGN PATENT DOCUMENTS

| | | | | |
|---|---|---|---|---|
| DE | 10362300 B4 | * | 6/2013 | ......... B60R 13/0212 |
| EP | 2080649 | | 7/2009 | |

(Continued)

OTHER PUBLICATIONS

English translation of DE 10362300; retreived Apr. 3, 2017 via Patenttranslatelocated at www.epo.org.*

(Continued)

*Primary Examiner* — Jason S Daniels

(74) *Attorney, Agent, or Firm* — Rathe Lindenbaum LLP

(57) ABSTRACT

An operator station (100) for a work vehicle comprises a roof, a roof (102), that defines an outside air inlet (201); a floor (115); several windows (106) extending between the floor (115) and the roof (102) that together define in enclosed operator compartment; an operator seat (108) disposed within the operator compartment; an air-conditioning module (112) disposed adjacent to the floor (115); a first air conduit extending between an outside air inlet (201) and the air-conditioning module (112); and a second air conduit extending between the air-conditioning module (112) and a first conditioned air outlet of the roof (102).

20 Claims, 4 Drawing Sheets

(56) References Cited

U.S. PATENT DOCUMENTS

| | | | |
|---|---|---|---|
| 7,334,834 B2* | 2/2008 | Hill | B60H 1/00378 296/190.09 |
| 8,459,727 B2* | 6/2013 | Mayr | B62D 25/24 296/190.09 |
| 8,485,589 B2* | 7/2013 | Obe | B60H 1/00378 296/190.09 |
| 2007/0205633 A1* | 9/2007 | Waco | B60H 1/00378 296/190.09 |
| 2012/0003911 A1* | 1/2012 | Geiss | B60H 1/00378 454/143 |
| 2013/0203333 A1 | 8/2013 | Amura et al. | |
| 2014/0339001 A1 | 11/2014 | Tokiwa et al. | |
| 2015/0298749 A1* | 10/2015 | Zurinski | B62D 33/0617 296/190.08 |

FOREIGN PATENT DOCUMENTS

| | | | | |
|---|---|---|---|---|
| EP | 2428376 A1 * | 3/2012 | | B60H 1/00378 |
| EP | 2921327 | 9/2015 | | |
| JP | H08 119155 | 5/1996 | | |
| JP | 2004352085 | 12/2004 | | |

OTHER PUBLICATIONS

European Search Report for Application 16169886.5 dated Nov. 22, 2016.

* cited by examiner

OPERATOR STATION

RELATED APPLICATIONS

This application is related to the patent application Ser. No. 14/746,998 entitled "Roof for a Work Vehicle" that is being filed contemporaneously herewith.

FIELD OF THE INVENTION

The invention relates to work vehicles, such as construction or agricultural vehicles. More particularly it relates to air-conditioning systems and air conduits for operator stations of such work vehicles.

BACKGROUND OF THE INVENTION

Work vehicles, such as construction or agricultural vehicles typically have small enclosed operator stations. These operator stations are small, enclosed cabins, typically with seating for only a single person who is the operator of the work vehicle, although some enclosed operator stations may provide a small, stowable sitting platform or "jump seat" to temporarily accommodate a second person within the cabin for short periods of time.

Unlike the driver seat of an automobile or over-the-road truck, the operator seat is centrally located (side-to-side) within the operator station. This is beneficial since the operator station is intended (one) to accommodate a single operator and (two) to provide significant operator visibility to the work vehicle and to the surrounding environment upon which the work vehicle works.

Unlike automobiles and over-the-road trucks, the operator station has significantly greater visibility of the vehicle and the surrounding environment typically by providing glass walls. In one common arrangement, the operator station includes a glass front wall, left side wall, and right side wall that extend substantially from the floor of the operator station to the roof of the operator station.

A significant problem with operator stations is maintaining a comfortable working environment for the operator. Due to the small internal volume of operator compartments, the air must be regularly recirculated and supplemented with fresh outside air to keep the operator comfortable. Work vehicles, however, are typically operated in dirty environments with significant dust, dirt, and particles of plant matter contaminating the outside air. As a result, not only must the air be recirculated at a relatively high rate, but it must also be filtered very well to keep clean the operator, his clothing, his lungs, and the various controls.

Further, and due to the great deal of glass that defines the walls of the operator station, the interior of the operator compartment can become extremely hot or extremely cold due to solar radiation received through the large glass walls and lost through those same walls due to outward radiation and thermal conduction.

As a result, operator stations of work vehicles are typically provided with high-capacity air filtration and air-conditioning modules—both for heating and cooling. These air-conditioning modules are typically mounted on the interior of the operator station roof, with holes provided to the roof to permit the easy flow of air. Due to the limited size of the operator compartments, however, these air-conditioning modules typically reduce the operator's headroom. Further, conduits for distributing air within the operator compartment typically extend downward from the air-conditioning modules, thus further invading the operator's headroom and workspace.

What is needed, therefore, is an operator station with a new air-conditioning arrangement. It is an object of this invention to provide such an operator station.

SUMMARY OF THE INVENTION

In accordance with one aspect of the invention, an operator station (100) for a work vehicle comprises: a roof (102), wherein the roof (102) defines an outside air inlet (201) for receiving outside air and defines a first conditioned air outlet; a floor (115) disposed underneath the roof (102); a plurality of windows (106) extending between the floor (115) and the roof (102) and together with the floor (115) and the roof (102) defining an operator compartment that is enclosed on all sides; an operator seat (108) supported on the floor (115) and disposed within the operator compartment; an air-conditioning module (112) disposed adjacent to the floor (115), wherein the air-conditioning module (112) has a first air inlet and a first conditioned air outlet; a first air conduit extending between the outside air inlet (201) and the air-conditioning module (112) and configured to communicate outside air from the outside air inlet (201) into the first air inlet of the air-conditioning module (112); and a second air conduit extending between the first conditioned air outlet of the air-conditioning module (112) and the first conditioned air outlet of the roof (102) and configured to communicate conditioned air from the air-conditioning module (112) to the first conditioned air outlet of the roof (102).

The first air conduit may include a first generally vertical conduit portion disposed behind the operator seat (108).

The second air conduit may include a second generally vertical conduit portion disposed behind the operator seat (108).

The air-conditioning module may have a second air inlet opening directly into the operator compartment, wherein the second air inlet is disposed adjacent to the floor (115).

The air-conditioning module may have a second conditioned air outlet opening directly into the operator compartment, wherein the second conditioned air outlet of the air-conditioning module (112) is disposed adjacent to the floor (115).

The first generally vertical conduit portion may be coupled to a first generally horizontal air conduit portion, and the first generally horizontal air conduit portion may be disposed within the roof (102).

DETAILED DESCRIPTION

Figure 1:
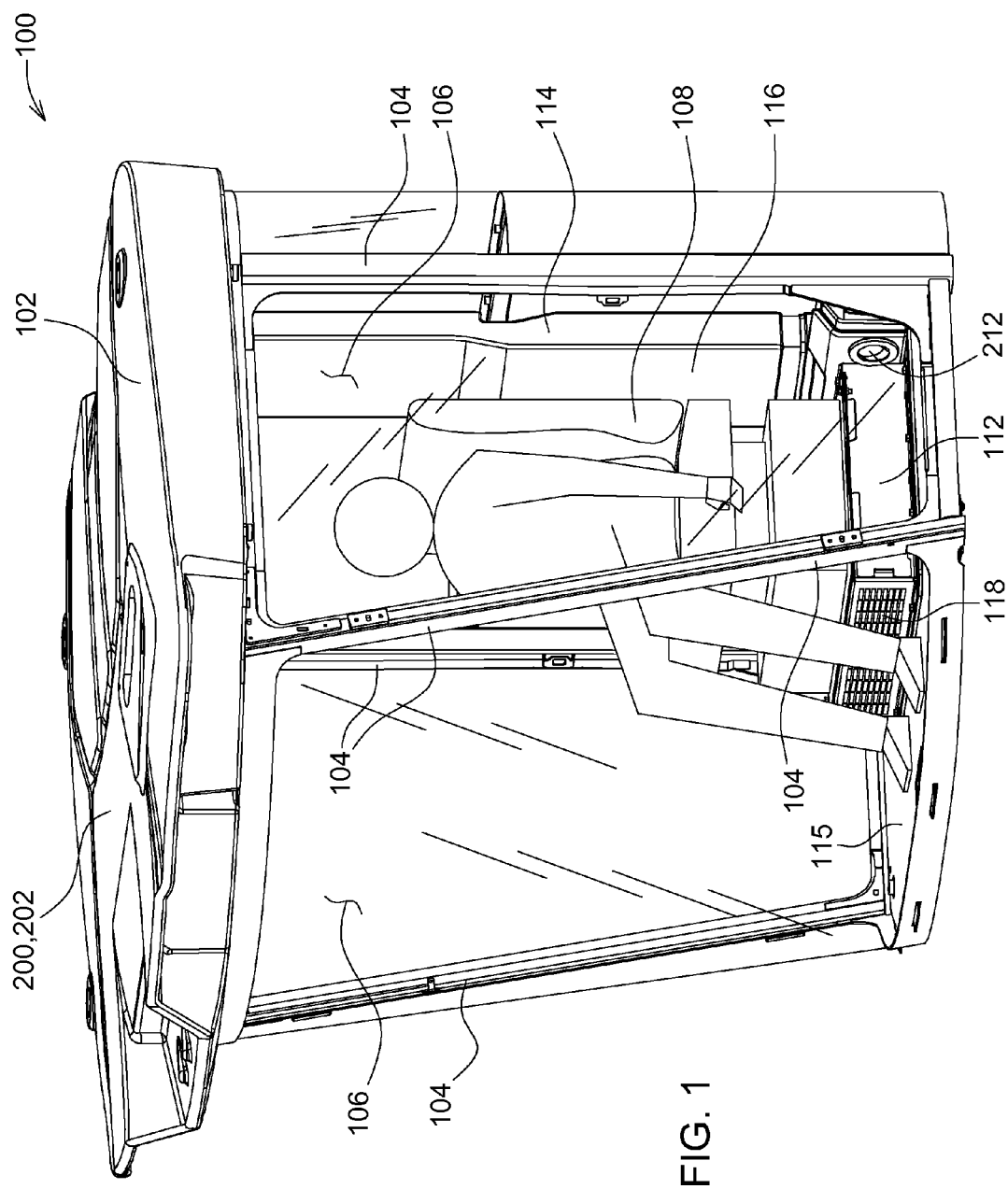
FIG. 1 is a perspective view of an operator station of a work vehicle having a roof in accordance with the present invention.

Referring to FIG. 1, an operator station 100 for a work vehicle is shown. The operator station 100 includes a roof 102, vertical supports 104, windows 106, an operator seat 108, air-conditioning module 112, and a rear vertical conduit 114.

The operator station is completely enclosed in the arrangement shown herein. It has a floor 115 from which the vertical supports 104 extend upward. Between the vertical supports are windows 106 which provide a view to the front, both sides, and the rear of the vehicle. The operator seat 108 faces forward so the operator can view vehicle operations through the windshield (the front facing window 106). A door 116 is provided to provide the operator with a left side view of vehicle operations. One of the windows 106 is disposed in the door 116.

The air-conditioning module 112 is disposed underneath the operator seat 108 where it will not block the operator's view. Air inlets 118 are provided in a front-facing surface of the air-conditioning module 112 to receive air from within the cab. The air-conditioning module 112 is configured to condition the air (heating, cooling, or both) and to force the air upward through the rear vertical conduit 114.

The rear vertical conduit 114 is coupled to the roof 102. The roof 102 receives air transmitted upward through the rear vertical conduit 114. The roof 102 distributes the air laterally and forwardly through internal conduits in the roof 102, whereupon the air exits through downwardly facing air directors at the terminus of those conduits. The air exits into the operator station, thereby providing the operator with a continuous source of conditioned air.

The roof 102 has a molded roof portion 200, that is formed by rotational molding. The molded roof portion 200 has a first surface 202 that is an outer and upwardly facing surface. The first surface 202 is exposed to the elements, and is integrally formed as part of the rotational molding process. There may be passages that extend through the first surface 202 to accommodate the heads of fasteners, antennas, and the like, but the first surface 202 is generally slightly convex, planar, and otherwise continuous over substantially its entire length and width.

Figure 2:
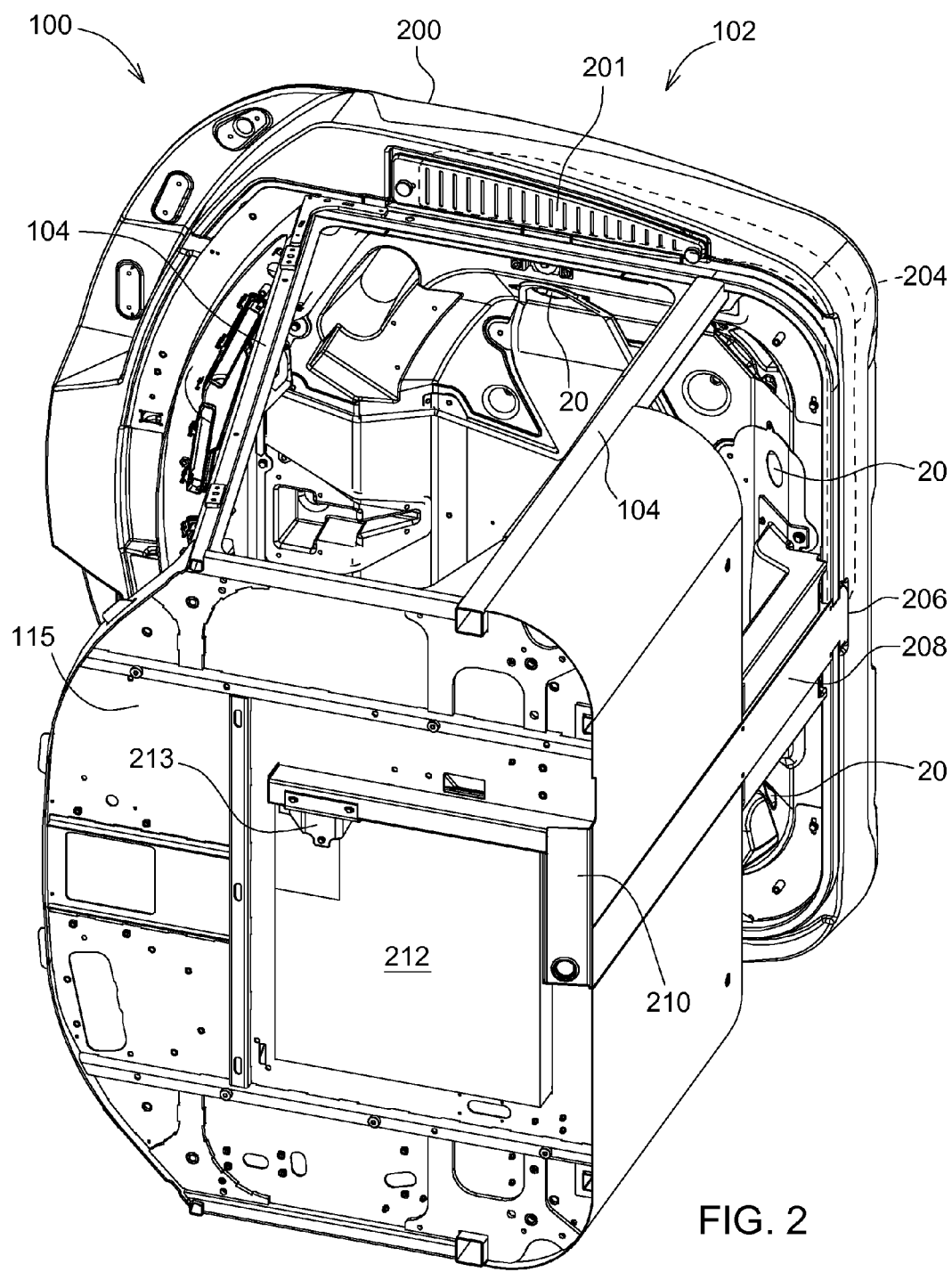
FIG. 2 is a perspective view of the operator station of FIG. 1 looking upward from the left rear side of the operator station.
Figure 3:
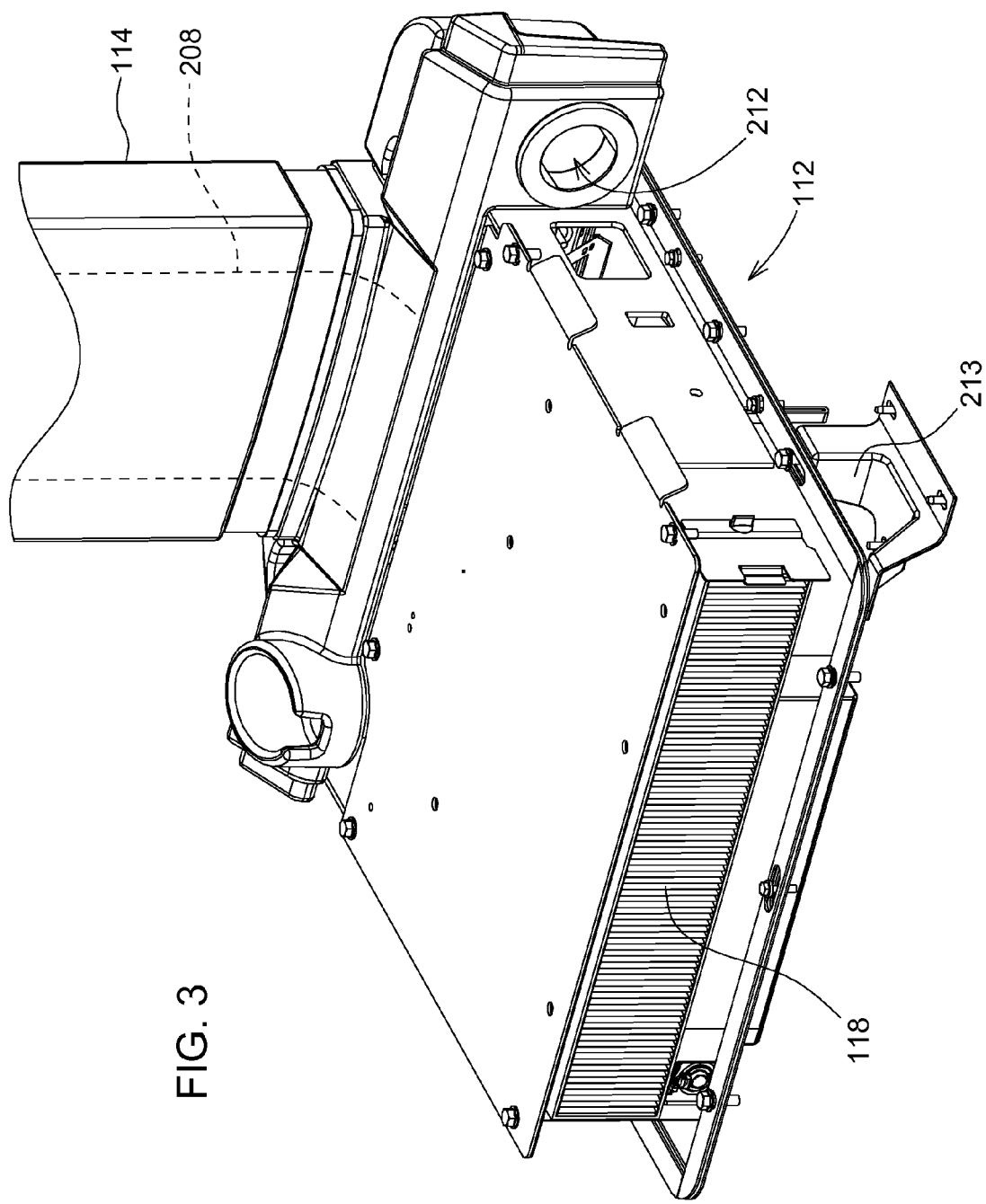
FIG. 3 is a perspective view of the air conditioning module and associated vents of the operator station of FIGS. 1-2 with the rest of the operator station removed.
Figure 4:
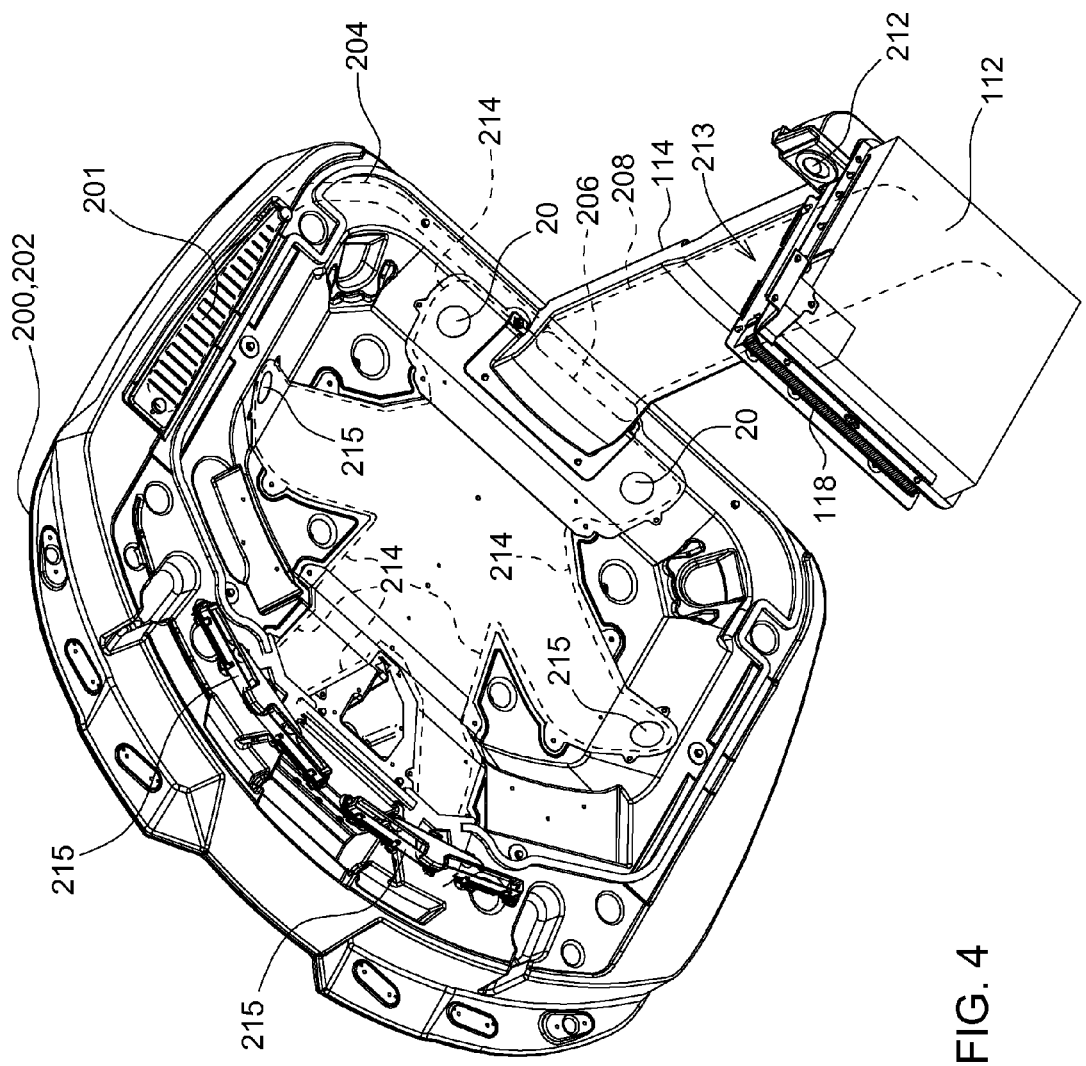
FIG. 4 is a perspective view of the operator station of FIGS. 1-3 showing the air conditioning module, the vertical air vent, and the roof of the operator station.

Referring to FIG. 2, outside air is received in an outside air inlet 201 that is disposed in a portion of the roof 102 that overhangs the left side of the operator station 100 and is disposed outside the operator compartment itself. The operator compartment is defined as the portion of the operator station that is enclosed by the roof 102, the floor 115, the windows 106 which form the front, left and right side walls of the operator station 100, and the vertical supports 104.

Air is received in the outside air inlet 201 and is communicated rearward through a horizontal air conduit 204 formed inside the roof 102. The horizontal conduit around the rear of the roof 102 to an air outlet 206 disposed in the roof 102. A vertical conduit 208 is coupled to the air outlet 206 directly behind the operator seat and carries the air vertically downward to a point adjacent to the floor 115. The lower end of the vertical conduit 208 is coupled to a further conduit 210. Conduit 210 extends around the floor 115 and an exposed lower portion of the air-conditioning module 112 that extends through the floor 115. Conduit 210 is in turn coupled to an air inlet 213 on the bottom of the air-conditioning module 112 to communicate air into the air-conditioning module 112. In this manner, a fan in the air-conditioning module 112 sucks air from roof 102, high outside the vehicle, through the outside air inlet 201 and down into the air-conditioning module 112 for conditioning.

The air-conditioning module 112 is also configured to receive air from inside the operator compartment through the air inlets 118 and to condition it. The air-conditioning module 12 includes a fan to suck air into the air-conditioning module 112, and to blow air out of the air-conditioning module 112. The air-conditioning module 112 further includes a means for conditioning the air passing their through, which can include heat exchangers for conveying engine heat to the air being conditioned (i.e. heating the air). It can also include heat exchangers such as evaporators for conveying heat out of the air being conditioned (i.e. cooling the air). It can also include various vents, flaps and internal conduits to direct the air between the various inlets and outlets of the air-conditioning module 112 and through the various air-conditioning elements. These various internal elements are of conventional arrangement.

Air that has been conditioned in the air-conditioning module 112 is directed out of the air-conditioning module 112 and through air outlets 212 adjacent to the floor 115 to enter the operator compartment directly.

Air that has been conditioned in the air-conditioning module 112 is also directed out of the air-conditioning module 112 and into the rear vertical conduit 114, which carries the air upward and into the roof 102 at a location above and directly behind the operator. The air received into the roof 102 is communicated forward and to each side of the vehicle through conduits 214 formed in the roof 102. Air outlets 215 disposed in the roof 102 receive air from the conduits 214 and pass the conditioned air into the operator compartment at the roof level. Further details of the construction of the air conduits in the roof 102 can be found in the patent application Ser. No. 14/746,998 entitled "Roof for a Work Vehicle" filed contemporaneously herewith and which is incorporated herein by reference in its entirety for all that it teaches.

The air-conditioning module 112 is of conventional arrangement, having operator controls that are configured to alternatively and selectively heat and cool the air in the operator compartment. The operator can select heating or cooling. The operator can select a desired source of air and air inlet (i.e. outside air inlet 201 or inside air inlet 118). The operator can also select the desired conditioned air outlets 215 in the roof, or air outlet 212 adjacent to the floor.

The operator controls by which the operator makes these selections of airflow and air temperature are disposed inside the operator compartment and are configured in a conventional manner.

The operator station that is described and illustrated in this document is provided to illustrate just one way the invention might be made. The scope of the invention is defined by the claims. The particular arrangements described and illustrated in this document are merely examples.

The invention claimed is:

1. An operator station for a work vehicle comprising:
   a roof, wherein the roof defines an outside air inlet for receiving outside air and defines a first conditioned air outlet;
   a floor disposed underneath the roof;
   a plurality of windows extending between the floor and the roof and together with the floor and the roof defining an operator compartment that is enclosed on all sides;
   an operator seat supported on the floor and disposed within the operator compartment, the operating seat facing in a forward direction;
   an air-conditioning module disposed adjacent to the floor, wherein the air-conditioning module has a first air inlet and a first conditioned air outlet;
   a first air conduit extending between the outside air inlet and the air-conditioning module and configured to communicate outside air from the outside air inlet into the first air inlet of the air-conditioning module; and a second air conduit extending between the first conditioned air outlet of the air-conditioning module and the first conditioned air outlet of the roof and configured to communicate conditioned air from the air-conditioning module to the first conditioned air outlet of the roof, wherein at least one of the first air conduit and the second air conduit vertically extends directly behind the operator seat, wherein the first air conduit extends within the second air conduit.

2. The operator station of claim 1, wherein the first air conduit includes a first generally vertical conduit portion disposed directly behind the operator seat.

3. The operator station of claim 2, wherein the first generally vertical conduit portion is coupled to a generally horizontal air conduit, and further wherein the generally horizontal air conduit is disposed within the roof.

4. The operator station of claim 3, wherein the generally horizontal air conduit comprises a central conduit portion to direct airflow forwardly along a fore-aft centerline of the roof.

5. The operator station of claim 4, wherein the generally horizontal air conduit further comprises first and second side branching conduit portions transversely branching off directly from the central conduit portion to deliver conditioned air to conditioned air outlet openings on first and second opposite transverse sides of the roof.

6. The operator station of claim 5, wherein the generally horizontal air conduit further comprises first and second forward branching conduit portions obliquely branching off directly from the central conduit portion deliver conditioned air to conditioned air outlet openings proximate a forward end of the roof.

7. The operator station of claim 1, wherein the second air conduit includes a second generally vertical conduit portion disposed directly behind the operator seat.

8. The operator station of claim 1, wherein the air-conditioning module has a second air inlet opening directly into the operator compartment, wherein the second air inlet is disposed adjacent to the floor.

9. The operator station of claim 8, wherein the second air inlet of the air-conditioning module is forward the operator seat.

10. The operator station of claim 8, wherein the second air inlet faces in the forward direction.

11. The operator station of claim 8, wherein the operator station configured to provide an operator with selectivity regarding sourcing of air to the air-conditioning unit by either the outside air inlet or the second air inlet.

12. The operator station of claim 1, wherein the air-conditioning module has a second conditioned air outlet opening directly into the operator compartment, wherein the second conditioned air outlet of the air-conditioning module is disposed adjacent to the floor.

13. The operator station of claim 12, wherein the second conditioned air outlet of the air-conditioning module faces in the forward direction.

14. The operator station of claim 13, wherein the second conditioned air outlet of the air-conditioning module is rearward of the operator seat.

15. The operator station of claim 1, wherein the plurality of windows form rear corners of the operator station.

16. The operator station of claim 1, wherein the plurality of windows are curved and form rounded rear corners of the operator station.

17. The operator station of claim 1, wherein the air-conditioning unit lies underneath the operator seat.

18. An operator station for a work vehicle comprising:

a roof, wherein the roof defines an outside air inlet for receiving outside air and defines a first conditioned air outlet;

a floor disposed underneath the roof;

a plurality of windows extending between the floor and the roof and together with the floor and the roof defining an operator compartment that is enclosed on all sides, wherein the plurality of windows form rear corners of the operator station;

an operator seat supported on the floor while being disposed within the operator compartment to face in a forward direction;

an air-conditioning module disposed adjacent to the floor underneath the operator seat, wherein the air-conditioning module has a first air inlet, a first conditioned air outlet and a second air inlet opening directly into the operator compartment;

a first air conduit extending between the outside air inlet and the air-conditioning module and configured to communicate outside air from the outside air inlet into the first air inlet of the air-conditioning module, wherein the first air conduit includes a first generally vertical conduit portion disposed directly behind the operator seat; and a second air conduit extending between the first conditioned air outlet of the air-conditioning module and the first conditioned air outlet of the roof and configured to communicate conditioned air from the air-conditioning module to the first conditioned air outlet of the roof, wherein the second air conduit includes a second generally vertical conduit portion disposed directly behind the operator seat, wherein the first air conduit extends within the second air conduit.

19. An operator station for a work vehicle comprising:

a roof, wherein the roof defines an outside air inlet for receiving outside air and defines a first conditioned air outlet;

a floor disposed underneath the roof;

a plurality of windows extending between the floor and the roof and together with the floor and the roof defining an operator compartment that is enclosed on all sides;

an operator seat supported on the floor and disposed within the operator compartment, the operating seat facing in a forward direction;

an air-conditioning module disposed adjacent to the floor, wherein the air-conditioning module has a first air inlet and a first conditioned air outlet;

a first air conduit extending between the outside air inlet and the air-conditioning module and configured to communicate outside air from the outside air inlet into the first air inlet of the air-conditioning module; and a second air conduit extending between the first conditioned air outlet of the air-conditioning module and the first conditioned air outlet of the roof and configured to communicate conditioned air from the air-conditioning module to the first conditioned air outlet of the roof, wherein at least one of the first air conduit and the second air conduit vertically extends directly behind the operator seat, wherein the first air conduit includes a first generally vertical conduit portion disposed directly behind the operator seat, wherein the first generally vertical conduit portion is coupled to a generally horizontal air conduit, and further wherein the generally horizontal air conduit is disposed within the roof, wherein the generally horizontal air conduit comprises a central conduit portion to direct airflow forwardly along a fore-aft centerline of the roof and wherein the generally horizontal air conduit further comprises first and second side branching conduit portions transversely branching off directly from the central conduit portion to deliver conditioned air to conditioned air outlet openings on first and second opposite transverse sides of the roof.

20. The operator station of claim 19, wherein the generally horizontal air conduit further comprises first and second forward branching conduit portions obliquely branching off directly from the central conduit portion deliver conditioned air to conditioned air outlet openings proximate a forward end of the roof.

\* \* \* \* \*